(12) United States Patent
Leiber (10) Patent No.: US 10,239,578 B2
(45) Date of Patent: Mar. 26, 2019

(54) ELECTRIC PROPULSION SYSTEM FOR A VEHICLE, PARTICULARLY A BATTERY-POWERED E-BIKE, S-PEDELAC, E-BIKE WITH CONTROL IN DIFFERENT MODES

(71) Applicant: LSP Innovative Automotive Systems GmbH, Unterföhring (DE)

(72) Inventor: Thomas Leiber, München (DE)

(73) Assignee: LSP Innovative Automotive Systems GmbH, Unterföhring (DE)

( * ) Notice: Subject to any disclaimer, the term of this patent is extended or adjusted under 35 U.S.C. 154(b) by 74 days.

(21) Appl. No.: 14/707,234

(22) Filed: May 8, 2015

(65) Prior Publication Data

US 2016/0325802 A1    Nov. 10, 2016

(30) Foreign Application Priority Data

May 9, 2014 (DE) .................. 10 2014 106 591

(51) Int. Cl.
| | |
|---|---|
| *B62M 6/55* | (2010.01) |
| *B62M 6/00* | (2010.01) |
| *B62M 11/04* | (2006.01) |
| *B62M 15/00* | (2006.01) |
| *B62M 25/02* | (2006.01) |

(52) U.S. Cl.
CPC ............... *B62M 6/55* (2013.01); *B62M 6/00* (2013.01); *B62M 11/04* (2013.01); *B62M 15/00* (2013.01); *B62M 25/02* (2013.01)

(58) Field of Classification Search
CPC ......... Y10T 29/49895; Y10T 403/7075; F16B 19/00; F16B 19/02; F16B 5/0614
See application file for complete search history.

(56) References Cited

U.S. PATENT DOCUMENTS

| | | | |
|---|---|---|---|
| 2,331,976 | A | 10/1943 | Hare |
| 4,397,369 | A | 8/1983 | Read |
| 5,361,863 | A | 11/1994 | Goodwin |
| 6,957,129 | B2 | 10/2005 | Hatanaka et al. |
| 9,017,201 | B2 | 4/2015 | Hino et al. |
| 2008/0071436 | A1 | 3/2008 | Dube et al. |

(Continued)

FOREIGN PATENT DOCUMENTS

| | | |
|---|---|---|
| DE | 4302838 A1 | 8/1994 |
| DE | 60223307 T2 | 2/2008 |
| DE | 102012109637 A1 | 4/2013 |

(Continued)

OTHER PUBLICATIONS

Search Report dated Feb. 5, 2015 in DE Application No. 102014106591.3.

(Continued)

*Primary Examiner* — Victor L MacArthur
(74) *Attorney, Agent, or Firm* — Panitch Schwarze Belisario & Nadel LLP (57) ABSTRACT

The invention relates to a drive system for a vehicle, having a drive or electromotor, a crankshaft and a transmission, in particular a hub transmission. It is provided according to the invention that the transmission (10) is arranged in the central region of the vehicle, in particular the region of the crankshaft (1) and in particular is integrated and the crankshaft rotational speed is transmitted.

18 Claims, 8 Drawing Sheets

(56) References Cited

U.S. PATENT DOCUMENTS

2016/0221635 A1* 8/2016 Kuehlcke ................ B62M 6/55

FOREIGN PATENT DOCUMENTS

| DE | 102012023551 A1 | 6/2014 | |
|---|---|---|---|
| EP | 2192317 A1 | 6/2010 | |
| JP | H08295281 A | 11/1996 | |
| JP | H11240481 A | 9/1999 | |
| JP | 5246656 B2 | 7/2013 | |
| WO | 2011013109 A1 | 2/2011 | |
| WO | 2011124415 A1 | 10/2011 | |
| WO | 2011154657 A1 | 12/2011 | |
| WO | WO2015024701 A1 * | 2/2015 | .............. B62M 6/55 |

OTHER PUBLICATIONS

Search Report dated Oct. 7, 2015 in EP Application No. 15166980.1.

* cited by examiner

ELECTRIC PROPULSION SYSTEM FOR A VEHICLE, PARTICULARLY A BATTERY-POWERED E-BIKE, S-PEDELAC, E-BIKE WITH CONTROL IN DIFFERENT MODES

CROSS REFERENCE TO RELATED APPLICATIONS

This application claims priority to German Patent Application No. 10 2014 106 591.3, filed on May 9, 2014, the disclosure of which is incorporated herein by reference.

The invention relates to an electric drive system for a vehicle, in particular a battery-powered e-bike, S-Pedelec, e-bike, and the control thereof and operating modes.

PRIOR ART

There are drive systems for Pedelecs and e-bikes in two usual forms:
- wheel hub drives either on the front wheel or the rear wheel
- central drives (for example by the companies Bosch, Panasonic) with rear wheel gears.

Wheel hub drives transfer the force directly to the impeller. They have the advantage that they can be simply installed in the front wheel and rear wheel. As the wheel hub motor is operated at low rotational speeds (wheel speed approx. 300-400 rpm for S-Pedelecs at 45 km/h, 27 inch wheels), a high torque is required for the power. This has the consequence that wheel hub motors have a high weight, as the torque determines the size of the electromotors. Additionally, the high non-sprung masses and the high costs are disadvantageous, as a large quantity of rare earth magnets have to be used. This has the consequence that wheel hub drives are used primarily in Pedelecs with lower support power (250 Watt).

Central drives generate the power/torque in the central region of the vehicle. In such a drive system, the power/torque is generated by a small electromotor which works at high rotational speeds (approx. 3000 rpm). The rotational speed of the electromotor is reduced by several gear ratios (as a rule, 2-3 gear ratios) and vice versa, the torque of the electromotor increases proportionally. The force introduction occurs on the crankshaft. As the maximum crankshaft rotational speed which a human can provide is approx. 100 rpm, a ratio of the motor rotational speed to the crankshaft rotational speed $i_{Mot} \rightarrow CS$ of approx. 25-30 is required. In order to bring the drive force to the rear wheel, due to the ratios of the crankshaft rotational speed to the wheel rotational speed, a ratio $i_{DR}$=rotational speed drive/rotational speed wheel <1 is required (as a rule, $i_{DR}$=<0.5). In the rear axle, different gears (hub gears, derailleur gears, continuously variable transmissions with balls) are used which enable a further ratio adjustment (iCVT=0.5-1.8 for a continuously variable transmission).

Overall, central drives have advantages over wheel hub motors as, despite a use of a transmission, a weight saving due to the use of a small electromotor is possible. This advantage becomes greater, the higher the drive power/torque at the rear wheel. Therefore, central drives have been used for S-Pedelecs.

The disadvantage with central drives is the loss of efficiency, caused by several gear ratios (four to five ratios). Additionally, the torque which a central motor can generate is primarily limited by the drive elements and gears available on the market. As hub gears/continuously variable transmissions are designed for use in the bicycle (usually narrow bicycle chains). The chain is therefore the weak link, in particular with use of central motors having high output torque. Additionally, the gears having high input torques are loaded very heavily at the rear wheel.

Object of the Invention

The object of the invention is to design a compact drive system having a high degree of efficiency.

Solution of the Object

The object of the invention may be solved by a drive system having features of the various attached claims.

The drive system is based on the basic idea that the force of the crankshaft does not act directly on the rear axle, as is usual for central motors having a hub gear in the rear wheel, but that the hub gear (first transmission) is integrated into the central region and the crankshaft rotational speed is transmitted.

Further embodiments or designs of the invention and the advantages thereof are contained in the further claims, which are also referred to here for descriptive purposes.

A novel central drive is created with the invention or its embodiments/designs, in which a, in particular continuously variable, transmission, a crankshaft having pedals and a highly efficient electromotor are integrated into a novel compact drive system. Therein, the crankshaft can be mounted rotatably in one possible embodiment, and to be fixed, i.e. not rotatable, in another embodiment.

If the crankshaft is mounted rotatably, the rotation of the crankshaft is transmitted with a ratio <0.3 (typical value 0.2-0.25) to the first transmission and the rotation of the motor is transmitted with a ratio >3 (typical value 4-5) to the first transmission. Additionally, the transmission of the central drive according to the invention is required, i.e. the output shaft of the first transmission to the rear wheel $i_{DR}$>1 (typical value $i_{DR}$=2), whilst for usual central drives, a transmission of approx. $i_{DR}$=0.5 is required.

The invention or its embodiments/designs lead to the following advantages:
- the force transfer of the electromotor to the rear wheel can be implemented with less gear ratios than in conventional central motors, as the number of gear ratios is smaller if the crankshaft is stepped up beforehand to the force exertion axle of the electromotor.
- additionally, the input torque or the transmission is reduced significantly by the integration of the hub gear/of the first transmission into the central region. The input rotational speed of the first transmission is approximately a factor of 4 higher ($i_{DR}$=2/$i_{DR}$=0.5), the input torque of the first transmission is lower for a given power by the factor of 4. The construction size of the first transmission is determined by the active torque. The first transmission can therefore be made smaller or the total drive torque can be significantly increased in comparison to transmissions arranged on the rear wheel,
- the drive system is constructed modularly and can be converted into a pure e-bike drive without pedals (with fixed foot rests) by a slight modification,
- the rear wheel is free of gear elements and can be implemented more simply and resiliently,
- standard chains from the motorbike industry can be used as there is no longer a restriction due to the gears available on the market, clearly reduced loading on the individual components of the drive system, in particular the chain connecting the output shaft of the first transmission to the rear wheel is loaded less (smaller tensile forces), whereby a significantly higher torque is possible at the rear axle for the same chain selection, the rotational speed of the drive motor must not necessarily be transmitted to the crankshaft rotational speed, which is typically required with ratios of 20:1-30:1 for conventional Pedelecs; therefore simpler embodiments as the torque is not transmitted to the crankshaft but to the first transmission and in a further step to the rear axle, motor rotational speed of the drive motor is not limited, as the rotational speed is transferred to the crankshaft; a high motor rotational speed can therefore be selected, whereby greater torques are able to be achieved.

Overall, the embodiment of the drive system leads to a very efficient and compact drive having a high degree of efficiency as well as a high power at a low weight.

In the sense of the use of standard gears, i.e. continuously variable transmissions having balls having only one input pinion, the introduction of an intermediate shaft is required. This indeed has a slight disadvantage of degree of efficiency, however enables a further internal ratio and therefore higher forces at the rear wheel or small primary ratio gear wheel. Additionally, the construction elements can be arranged such that the drive module is constructed to be very narrow, which is desired in particular for Pedelecs, due to the ergonomics.

An important feature of the drive system is the compact arrangement of the drive elements in a triangle configuration.

Additionally, a simple, efficient cooling of the drive module is implemented with embodiments of the invention.

In the sense of a module construction, the drive system can be modified for a pure e-bike without pedals, in which the crankshaft is replaced by a fixed shaft and foot rests are attached to the shaft. In such an embodiment it is useful to select a ratio between the intermediate shaft and transmission of greater than 1, such that the power can be further increased by the use of a high speed motor, for an otherwise unchanged drive system.

The drive module is additionally very easily implemented by a sandwich plate construction and enables an easy assembly and maintenance-friendliness due to plug-in drive motors as well as easy accessibility of the drive elements.

A drive system implemented according to the invention enables different various operating modes:

in a first operating mode, the vehicle is driven purely mechanically via the crankshaft.

(S)-Pedelec operating mode:

Crankshaft torque reinforcement: motor supplies toque depending on the measured torque of the crankshaft. This is the typical Pedelec operating mode e-bike operating mode: purely electrical control. Motor drives the vehicle independently of crankshaft rotational speed and torque. This is the purely electric operation in which the crankshaft is still.

Additionally, novel, innovative operating strategies can be implemented:

BSMode1: Mechanical operation with support by electromotor in a form that the power loss of the drive train is compensated for or optionally, the rolling resistance is compensated for. The support of the electromotor is adjusted corresponding to the rotational speed-dependent losses of the drive system. A corresponding ease of operation and low weight of the vehicle is therefore suggested to the driver.

BSMode2: Complete driving resistance compensation by evaluation by an additional sensor system (gyro sensor) to determine the gradient. In this case, a vehicle model is calculated in which the driving resistances (air resistance, rolling friction, downhill force) are determined and the motor supports accordingly.

BSMode3: Sport mode by adjustment of the desired power and corresponding support of the motor according to the evaluation of the vehicle model.

The drive according to the invention and its embodiments have the following advantages over alternative drive systems:

compact construction
low weight
modular construction for Pedelec and e-bike
high acceleration and climbing ability
low thermal loading
cost-effective frame construction
implementation of a plurality of operating types in a vehicle, in a drive system The drive motor can advantageously include cooling, wherein in particular a cooling channel is provided which is formed by baffles, which are used in the frame between the frame plates, wherein the air input is on the upper side of the frame and is deflected downwards and cools the housing of the drive motor.

The drive system according to the invention having a drive motor and a crankshaft and a transmission can be used for a vehicle which is driven purely mechanically, in particular via the crankshaft.

Likewise it is possible that the drive system having a drive motor and a crankshaft and a transmission has a crankshaft torque reinforcement, wherein in particular the drive motor generates a torque and supplies it via the second transmission depending on the measured torque of the crankshaft.

It is also possible that the drive system drives the vehicle purely electrically, wherein in particular the drive motor drives the vehicle independently of the crankshaft rotational speed and the crankshaft torque.

Also, the drive system can be used such that a support by the electromotor occurs for a mechanical operation, wherein in particular the power loss of the drive train is compensated for or, optionally, the rolling resistance of the vehicle is compensated for.

It is advantageous if at least the total driving resistance is compensated for by means of the electromotor, in particular by means of evaluation of an additional sensor system (such as a gyro sensor) to determine the road gradient. For this purpose, advantageously, optionally, a vehicle model can be calculated wherein the driving resistances (such as air resistance, rolling friction and downhill force) are determined and the motor is active, supporting accordingly. A desired power can therefore be able to be adjusted and a corresponding support by the drive motor can occur corresponding to the evaluation of the vehicle model.

The drive motor can advantageously be implemented with integrated electronics as plug-in solutions.

DESCRIPTION OF THE FIGURES

Exemplary embodiments of the invention and their embodiments are described in more detail in the following description of the figures with reference to the drawing.

Here are shown.

Figure 1:
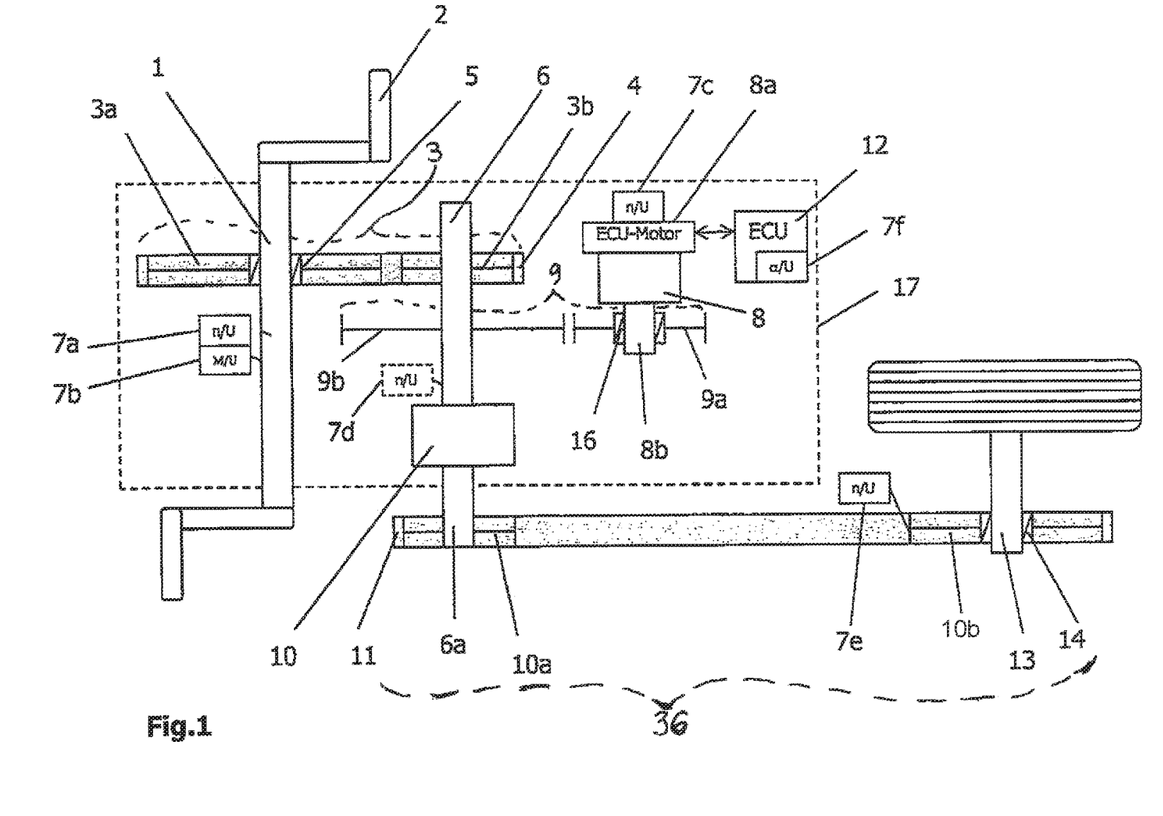
FIG. 1: the basic structure of the drive system having a sensor system for Pedelec operation.

FIG. 1 shows a first embodiment of the drive system. A crankshaft 1 having pedals 2 is stepped up to a shaft 6 via a chain or belt 4 and two pinions 3a and 3b, forming a further transmission 3 (i.e. $i_{CS \rightarrow CeS} = n_{3a}/n_{3b} < 1$, where $i_{CS \rightarrow CeS}$ is a ratio of rotational speeds between the crankshaft 1 and the shaft 6, defined here by the ratio $n_{3a}/n_{3b}$). One or two sensors (preferably composed in an assembly) detect rotational speed 7a and torque 7a of the crankshaft. Rotational speed and torque are preferably determined without contact by evaluation of the magnetic field of a magnetised crankshaft. The crankshaft is magnetised in the region of the sensors. A freewheel 5 on the crankshaft is integrated between the crankshaft 1 and the central shaft 6. An electromotor 8 having engine control electronics (motor ECU) 8a, rotational speed sensor 8b having a drive shaft 8c is reduced via a gear stage having two gear wheels 9a and 9b, forming another transmission 9 (i.e. $i_{MS \rightarrow CeS} = n_{9a}/n_{9b} < 1$, where $i_{MS \rightarrow CeS}$ is a ratio of rotational speeds between the motor shaft and the central shaft 6, defined here as $n_{9a}/n_{9b}$, wherein $n_{9a}$ and $n_{9b}$ are the rotational speeds of the shafts). The ratio i between the input shaft and its output shaft of first transmission 10 is greater than 1 in the sense of the invention if the input shaft rotates more quickly than the output shaft of the first transmission 10. The motor gear wheel 9a is expediently made from metal, the second gear wheel on the central shaft from light metal (aluminium, magnesium or high-strength plastic (also plastic/carbon)). The gear wheels are made from light metal, preferably helically cut, in particular for one embodiment of the gear wheel 9b for reasons of noise emissions. The ratio $i_{CS \rightarrow CeS}$ of the rotational speeds between the crankshaft and the central shaft 6 is smaller than 0.4 (typical value: 0.2-0.3), the ratio $i_{MS \rightarrow CeS}$ of the rotational speeds between the motor shaft and the central shaft 6 is greater than 3 (typical value: 4-5). A further freewheel 16 is integrated between the motor shaft 8c and the motor gear wheel 9a or alternatively a switchable clutch. The freewheel can also be omitted. The central shaft 6 acts on first transmission 10 which is implemented preferably to be continuously variable. A further sensor system 7d (optional) measures the rotational speed of the central shaft. The drive shaft 6a of the first transmission 10 is connected to a pinion 10a that is connected to the wheel shaft 13 via a wheel pinion 10b via a belt 11, forming yet a further transmission 36. The ratio is reduced, i.e. $i_{DR} = n_{10a}/n_{10b} > 1$ (typically a ratio of i $n_{10b}/n_{10a}$ of approx. 2 is usual for vehicles up to 45 km/h and 27 inch wheels). The rotational speed of the wheel pinion 10b is detected via a further rotational speed sensor 7e. The sensor is preferably implemented to be contactless and scans the flanks of the pinion. A further freewheel element 14 is integrated into the rear wheel shaft 13. This freewheel element enables a roll out with a high degree of efficiency as the drive system can be still. The drive unit composed as a mechanical unit is depicted with a dashed line 17.

If all drive elements are implemented as belts and the gear wheels between the motor and the shaft are implemented in a combination of plastic/metal, the drive system is completely maintenance-free.

The drive system additionally has a central control 12 having a gyro sensor 7f. The road gradient is evaluated via the gyro sensor and the different operating modes BSMode2 and BSMode3, which are described in FIG. 5b, are used for the control.

The construction of the drive system therefore enables a plurality of vehicle operating types in a vehicle (operation as a Pedelec and operation as a pure e-bike, or as a piece of sports equipment) and therefore universal application possibilities. In a Pedelec operating mode, the vehicle may legally be driven on cycle paths, in the e-bike operating mode on the road according to the German L1E authorisation regulation.

If the freewheel 16 is replaced by a clutch, the motor can be switched on and therefore a recovery of the braking energy can be enabled. The same is able to be implemented by leaving out the motor freewheel having the disadvantage that the motor must be rotated with a corresponding drag torque. This can be compensated for by corresponding current regulation of the motor (drag torque compensation), such that it is not detectable by the driver. This requires, however, a higher standby current and causes loss of efficiency.

By corresponding evaluation of the wheel rotational speed sensor 7e and the motor rotational speed 7c, the gear ratio can be determined and displayed to the driver.

During use of the sensor 7d, it can be omitted and a more accurate determination is possible, even if the vehicle rolls at a standstill of the motor/the crankshaft. If the degree of efficiency of the motor and the first transmission 10 are known, a recommendation of how the degree of efficiency and the range can be increased can be provided to the driver by a corresponding evaluation of the signals.

Figure 1A:
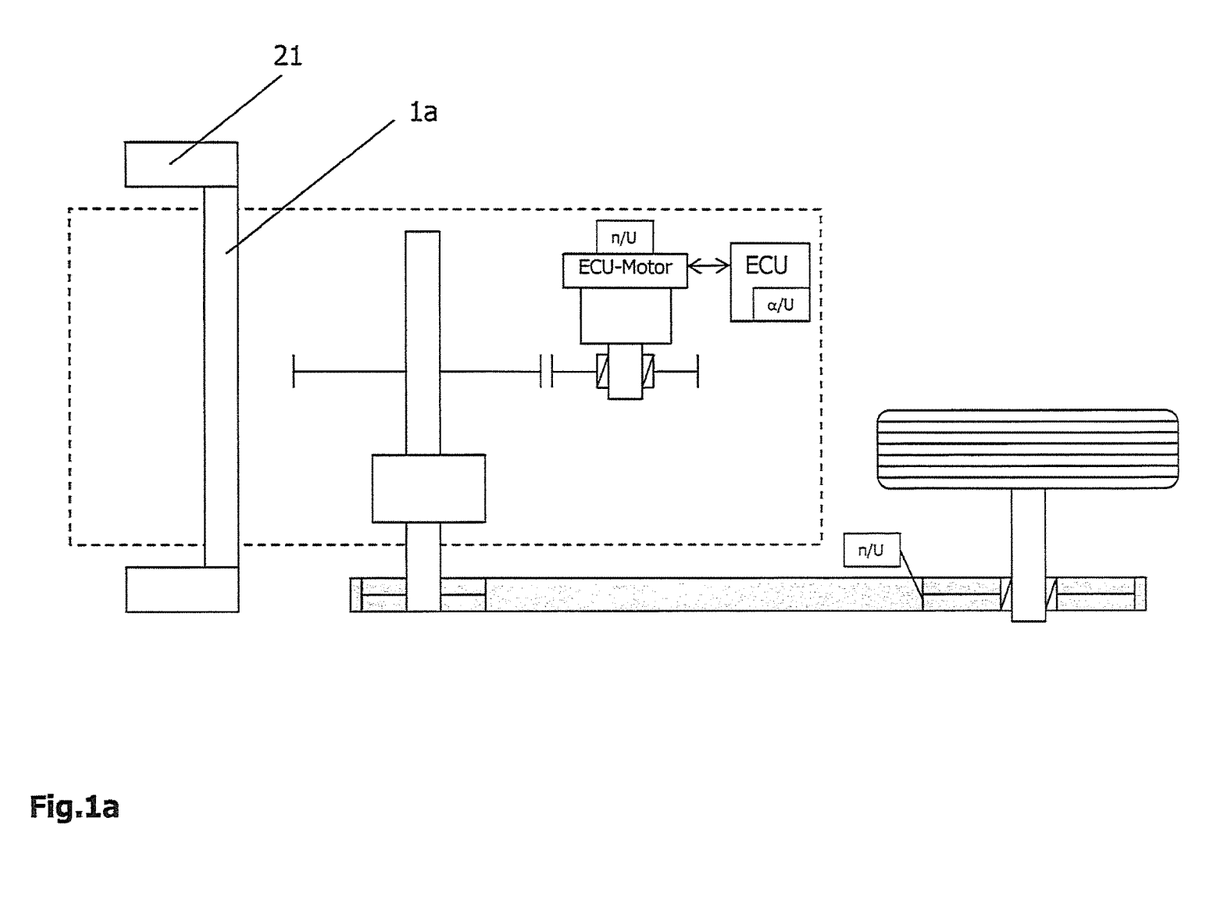
FIG. 1a: the basic structure of the drive system having a sensor system for e-bike operation.

FIG. 1a shows the modification of the drive system for a pure e-bike. Therein the pedals 2 are replaced by foot rests and the crankshaft 1a is clamped to be fixed, not rotatable. The sensors on the crankshaft and the ratio to the central shaft are omitted. The drive system otherwise remains unchanged in its structure (as described in FIG. 1).

Figure 2:
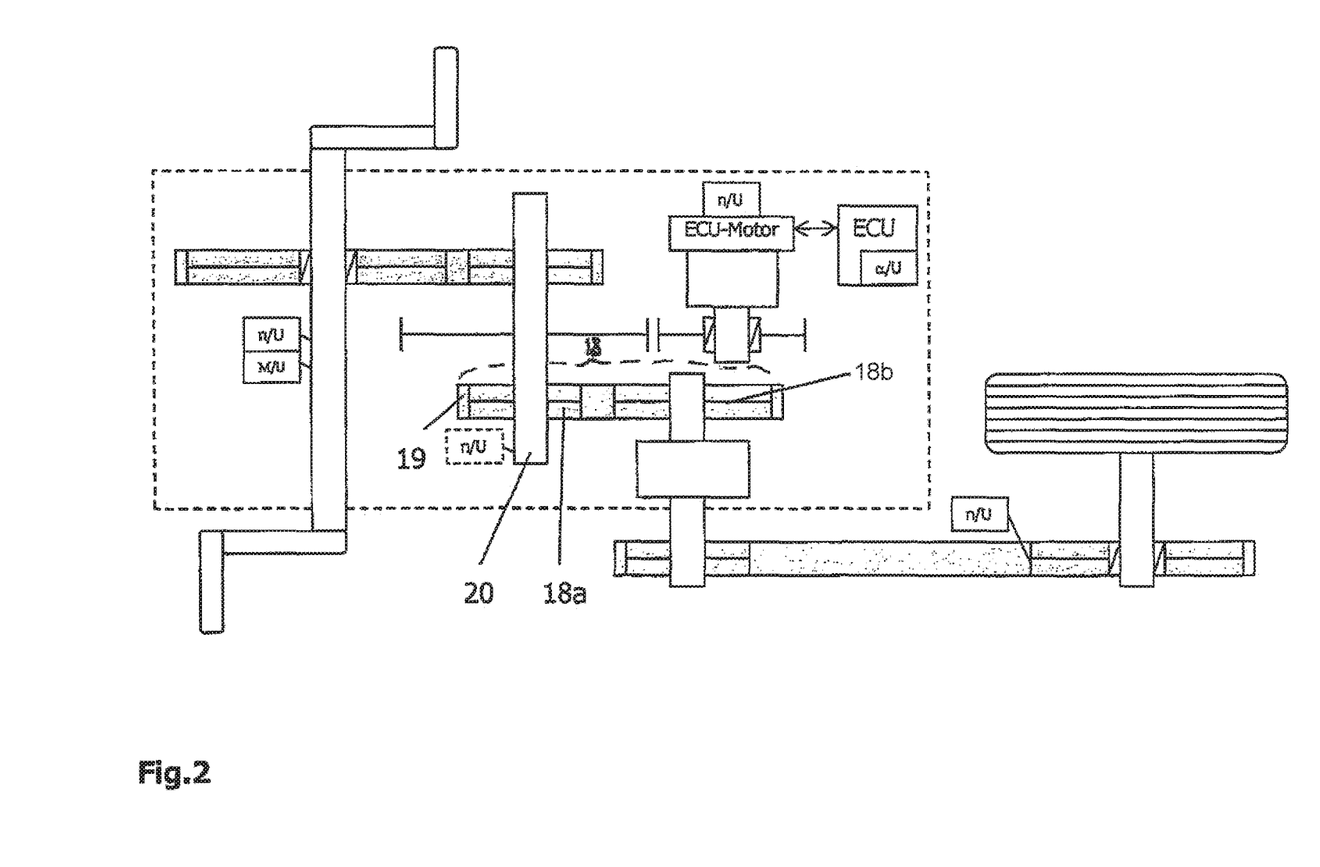
FIG. 2: an alternative structure of the drive system having an intermediate shaft.

FIG. 2 shows an alternative embodiment of the drive module having an intermediate shaft 20, via which the motor rotational speed and the crankshaft rotational speed are combined and are guided via a further ratio to the input shaft 6 of the first transmission 10 with a belt or chain 19 having 2 pinions 18a and 18b, forming a further transmission 18. The additional intermediate shaft is required if standard components (e.g. NuVinci transmissions) are used which only allow an input or higher overall gear ratios are implemented for higher vehicle final speeds or higher wheel rotational speeds for smaller wheel diameters. Furthermore, it can be required that due to 5 of the geometric arrangement of the drive elements, an intermediate shaft allows a better, narrower arrangement of the overall drive system. This is useful in particular in the sense of a very slim construction of the drive system which is desired in particular for Pedelecs.

Figure 2A:
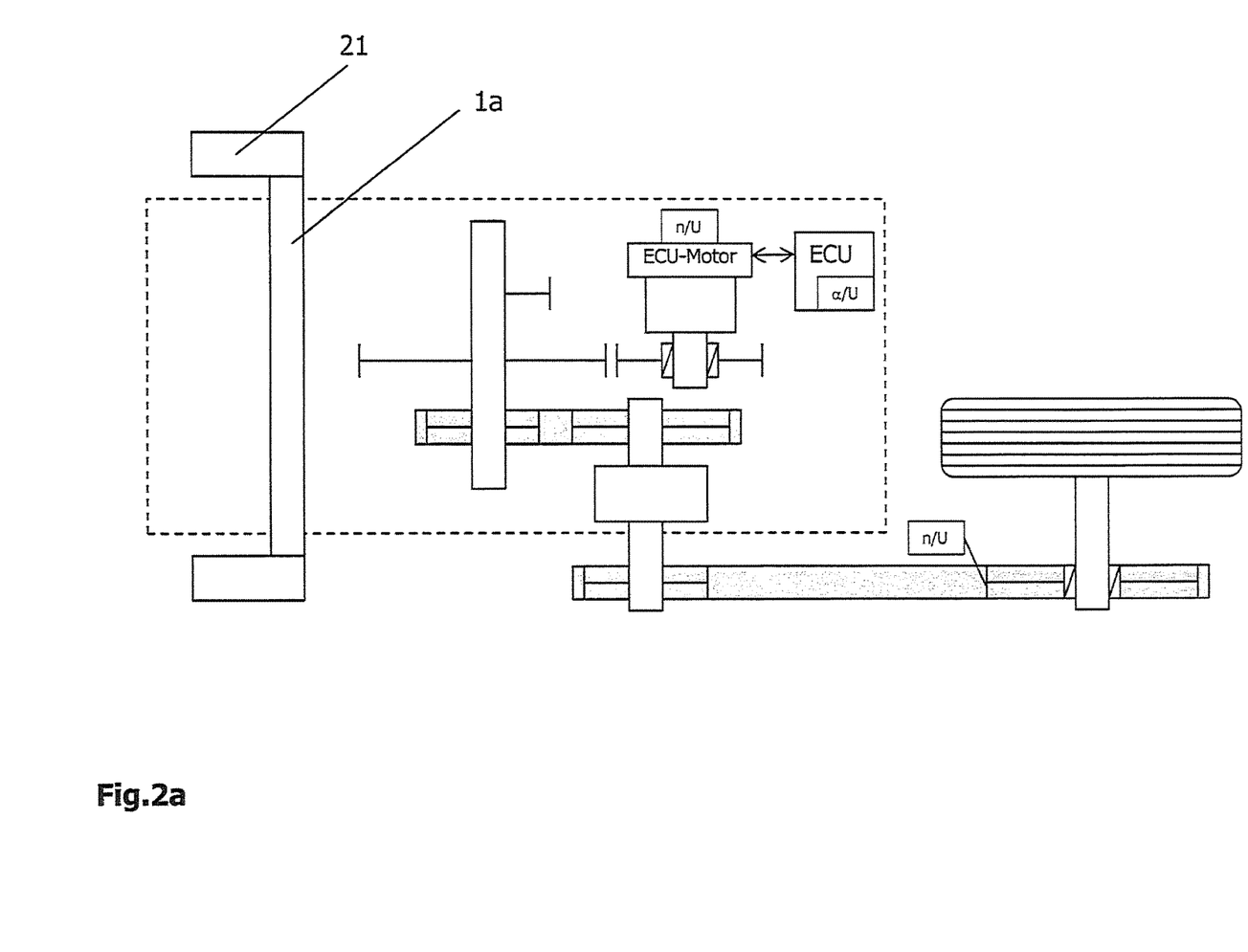
FIG. 2a: the alternative structure of the drive system having an intermediate shaft for e-bike operation.

FIG. 2a shows the modification of the drive system of FIG. 2 for a pure e-bike. Therein the pedals 2 are replaced by foot rests and the crankshaft 1a is clamped to be fixed, not rotatable. The sensors on the crankshaft and the ratio to the central shaft are omitted. The drive system otherwise remains unchanged in its structure (as described in FIG. 2).

Figure 3:
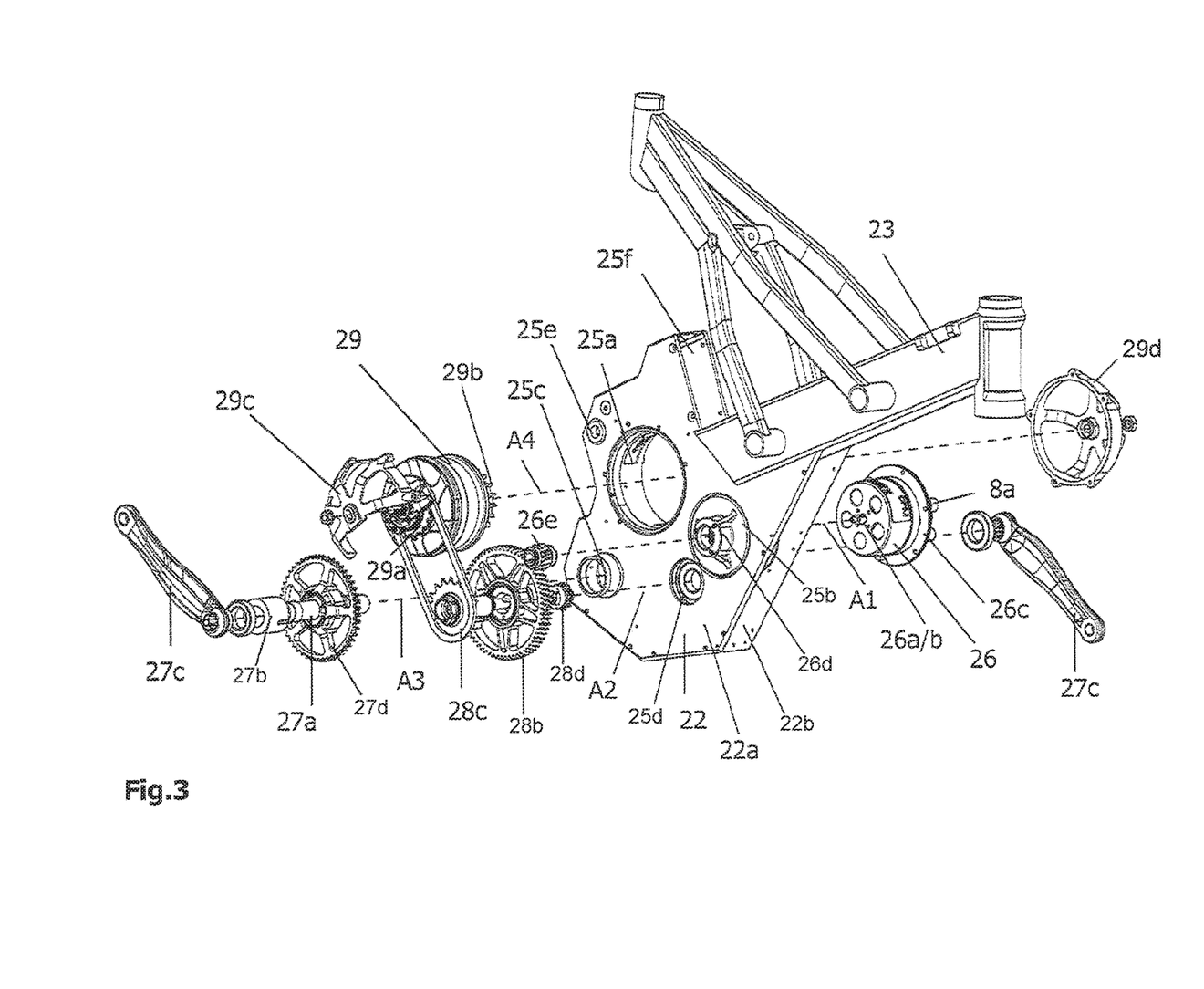
FIG. 3: depicts the constructive implementation of the drive system integrated into the vehicle frame in a 3D depiction.

FIG. 3 shows the constructive embodiment of the drive module, the spatial arrangement of the vehicle elements and the integration into the vehicle frame. The main frame of the vehicle consists of a drive module housing 22, a main tube 23 having a seat attachment 24. The drive module housing is composed of two plates 22a and 22b as well as diverse connection elements of the plates for 4 axles (drive axle A1, intermediate shaft axle A2, crankshaft axle A3, transmission axle A4). The plates are connected to one another via different parts/assemblies which receive the construction elements of the axles. The connection parts comprise a tube for the transmission 25a, a receiving assembly 25b for the electromotor and tube inserts for the crankshaft 25c and the intermediate shaft 25d and the rear wheel swing fixing 25e. The drive module housing is formed via the connection elements and the plates by positive connection of the connection elements to the plates. The drive module housing also contains a recess 25f in which the plug for a removable battery can be fitted. The drive module housing is connected to the main tube positively, for example via welding, riveting, screwing, gluing.

The first axle A1 comprises the electromotor 26 which has a drive shaft 26a having a key 26b and a flange 26c. The electromotor is plugged into a receiver 25b and screwed onto the plate 22b.

The receiver 25b contains a gear wheel 26e having a separate bearing 26d. The shaft of the drive motor is therefore free of radial forces.

In the second axle A3 are the crankshaft 27a, pedal crank 27c, crankshaft sensor 27b which are received by the connection element 25c. A crankshaft pinion 27d which is arranged between the housing plates in the assembled state is on the crankshaft axle. The axle A3 is mounted in the side plates.

The intermediate shaft 28a is arranged in a third axle A2. On the intermediate shaft are arranged the pinion for the crankshaft ratio 28d, gear wheel of the motor ratio 28b and drive pinion 28c for the transmission as well as mounting elements. Alternatively to the drive pinion, a belt gear wheel can be used. The axle A4 is mounted in the side plates.

The transmission 29 is arranged in the fourth axle A4. The axle comprises a transmission having a gear input pinion 29a and a gear output pinion 29b as well as a gear spider 29c which receives the transmission and connects to the frame and centres the axle A4. A second gear spider 29d is arranged on the rear side. Alternatively to the gear input pinion, a belt gear wheel can be used. The transmission and the intermediate shaft and gear input are connected to a chain or belt.

Figure 4:
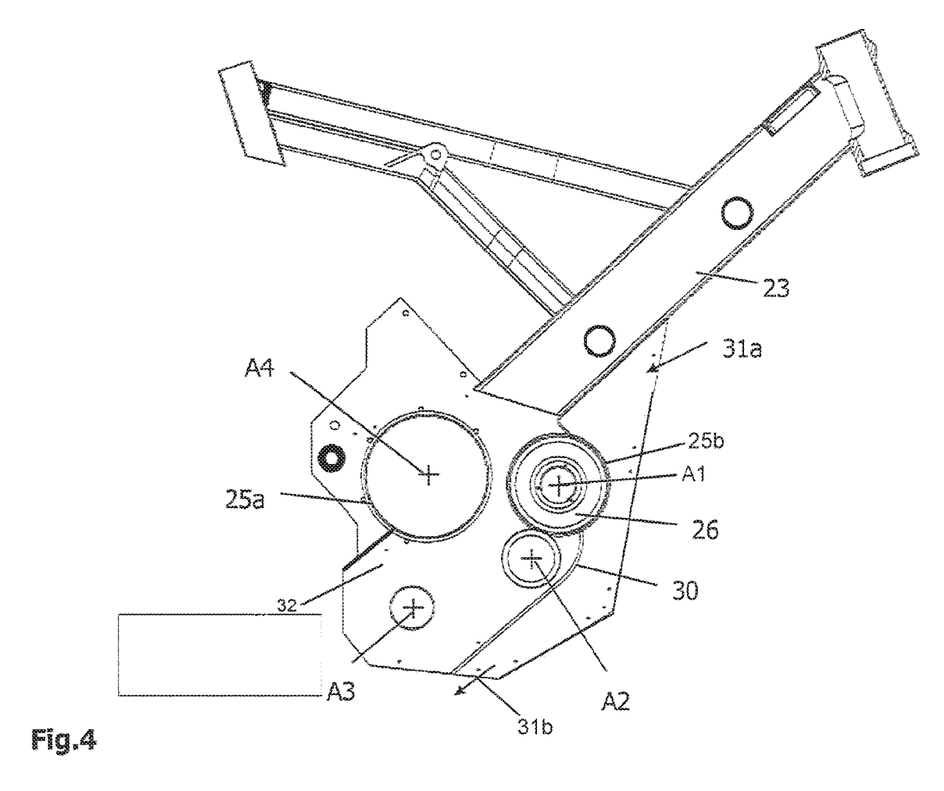
FIG. 4: depicts the cooling of the drive in a longitudinal cut through the drive system.

FIG. 4 shows the cooling of the drive system. A cross-section of the drive module between the plates is depicted. A baffle 30 is inserted between the plates that passes the vehicle air flow over the input 31a at the main tube on the housing 25b of the electromotor. The air exits below in the region 31b. The motor 26 which is implemented as an external rotor motor, rotates in the housing 25b and transfers the heat to the housing which is cooled efficiently via the air flow. Drive elements in the drying room 32 are additionally protected by this from the effect of dirt. Dirt which collects in the channel can simply be washed out via a steam jet.

Figure 5A:
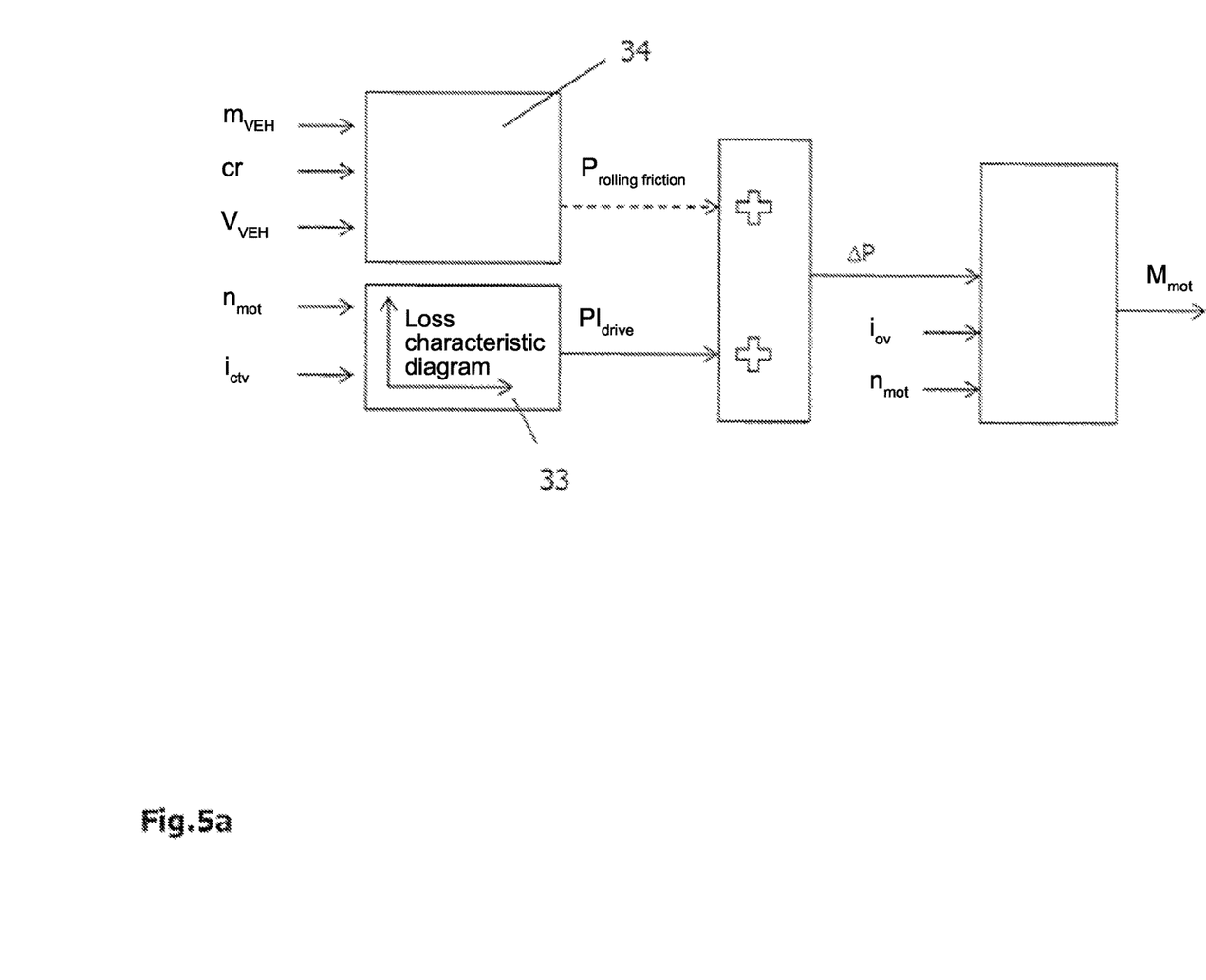
FIG. 5a: the basic support mode BSMode1.
Figure 5B:
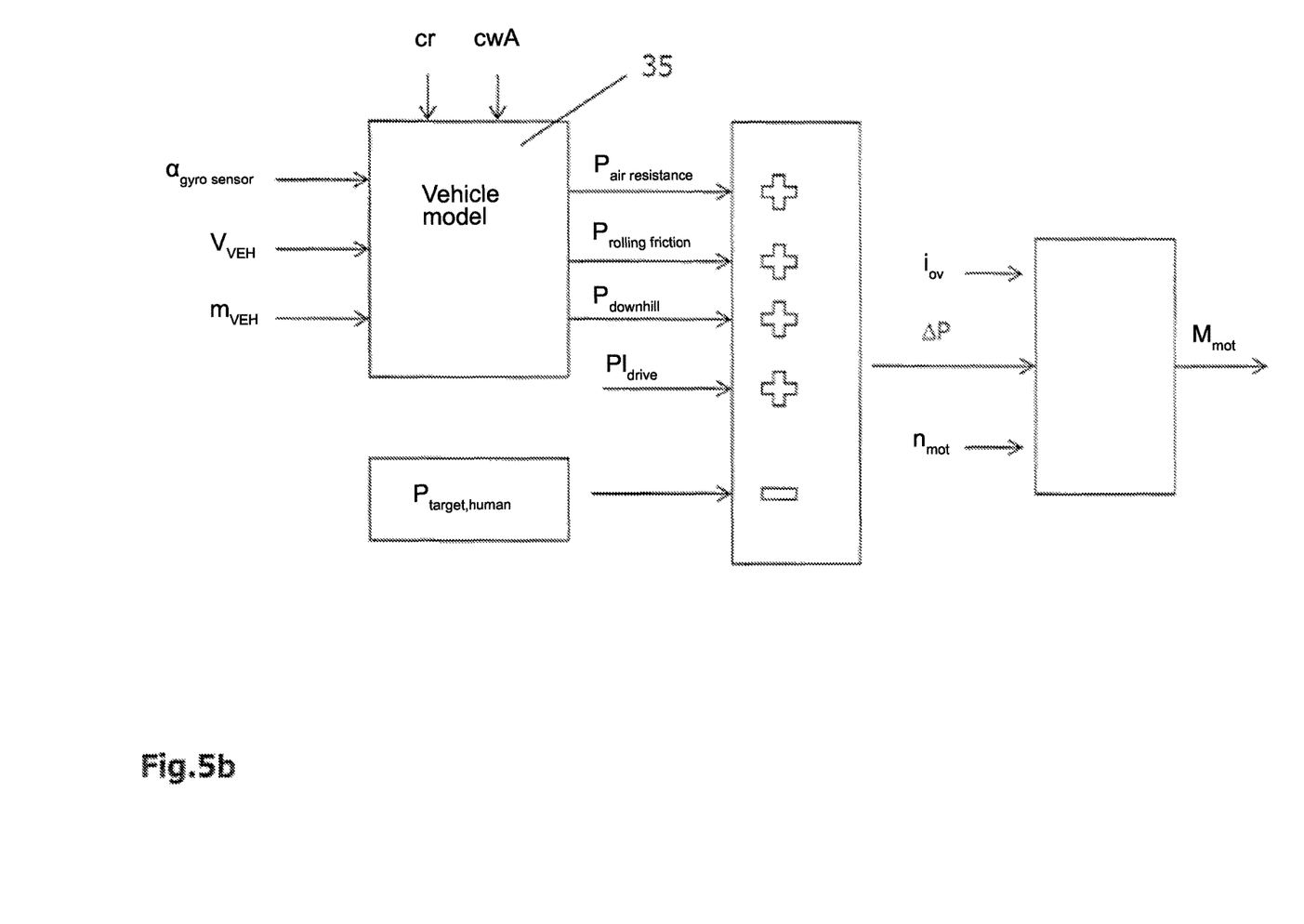
FIG. 5b: describes the further basic support modes BSMode2 and BSMode3.

FIG. 5a describes the basic support mode BSMode1. In the basic support mode, the drive loss of the drive is determined offline for the vehicle in a loss characteristic diagram 33 depending on the gear ratio $i_{CVT}$ and the motor rotational speed $n_{mot}$. During the driving operation, the power loss $P_{L,drive}$ is determined from the real rotational speed of the motor $n_{mot}$. The motor torque $M_{mot}$ which is required for the compensation of the losses can be calculated according to the overall gear ratio $i_{ov}$ and the motor rotational speed $n_{mot}$. Using this basic control, the vehicle is very easy to operate and compensates as far as possible for the higher weight of the vehicle having a drive system and battery. The operating mode is also possible in a reserve operation if the battery is operated close to the operating voltage lower limit and the mechanical operation is only still possible with lower power. The loading during driving without a battery is therefore reduced.

In addition to the loss compensation, it is useful to calculate and to compensate for the rolling resistance losses $P_{rolling\ friction}$. The rolling resistance loss can be determined with 34 from the vehicle-specific values of the rolling friction coefficient cr and vehicle weight $m_{VEH}$. This operating mode increases the ease of operation with increasing speed. The resistance increase due to increasing vehicle speed (air resistance increases quadratically with respect to speed) is therefore reduced and enables the driver an increased vehicle final speed with muscle power.

A variety of the BSMode1 is the rest and drag loss compensation of the electromotor in addition to the compensation of the drive losses. This is used with omission of the freewheel 16 between the motor shaft and the central shaft and also enables an ease of operation of the vehicle and an active recovery of braking energy for a fixedly coupled motor.

FIG. 5b describes a further basic support mode BSMode2 in which the overall losses of the vehicle are determined via a vehicle model 35. Input values for the vehicle model are gradient $a_{gyro\ sensor}$ (determined with gyro sensor 7f), $v_{VEH}$, $m_{VEH}$, cr and air resistance coefficient cwA and the drive losses $P_{L,drive}$ (see description FIG. 5a).

The overall losses are added up and can be converted into a support torque of the motor $M_{mot}$ corresponding to the overall support $i_{ov}$ and the motor rotational speed.

Additionally it is also possible to set a target support $P_{target,human}$ in a further operating mode BSMode3 in order to reduce the support torque of the motor $M_{mot}$. This operating mode allows a sport operation having constant power adjustment. A support is therefore ensured independently of the road and the vehicle speed and the setting of a constant pulse rate of the driver is more or less ensured. This is known to promote good health and reduced peak loading (e.g. for extreme mountain driving). BSMode3 enables the operation of the vehicle as a mobile fitness device.

LIST OF REFERENCE NUMERALS 1, 1a Crankshaft
2 Pedal
3a Crankshaft pinion
3b Gear shaft pinion
3 Transmission
4 Belt
5 Freewheel
6 Central shaft
6a Gear output shaft
7a Rotational speed sensor for crankshaft
7b Torque sensor for crankshaft
7c Rotational speed sensor electromotor
7d Rotational speed sensor central shaft
7e Rotational speed sensor rear wheel pinion
7f Gyro sensor
8 Drive or electromotor 8a Control electronics electromotor
8b Rotational speed sensor electromotor
8c Output shaft electromotor
9a Motor shaft gear wheel
9b Central shaft gear wheel
9 Transmission
10 Transmission
10a Pinion of the gear output shaft
10b Wheel pinion
11 Belt/chain to the rear wheel
11 Drive belt/drive chain
12 Central control
13 Rear wheel shaft
14 Wheel freewheel
15 Rear wheel
16 Freewheel electromotor
17 Drive system unit
18a Pinion intermediate shaft
18b Pinion gear input shaft
18 Transmission
19 Belt/chain between intermediate shaft and gear shaft
20 Intermediate shaft
21 Foot rests
22 Drive module housing
22a Drive module plate
22b Drive module plate
23 Main tube
24 Seat attachment
25a Tube for transmission
25b Receiving assembly for electromotor
25c Tube insert for crankshaft
25d Tube insert for intermediate shaft
25e Insert for fastening the rear wheel swing arm
25f Recess for battery plug
26 Electromotor
26a Shaft of the electromotor
26b Key
26c Motor flange
26d Motor receiver with bearing
26e Motor drive gear wheel
27a Crankshaft
27b Crankshaft sensor
27c Pedal crank
27d Crankshaft pinion
28a Intermediate shaft
28b Gear wheel for motor ratio
28c Drive pinion, drive belt wheel
29 Transmission
29a Gear input pinion
29b Gear output pinion
29c Gear spider
29d Second gear spider
30 Baffle
31a Input of the air flow
31b Output of the air flow
32 Drying room between the side plates for arrangement of sensors and drive elements
33 Loss characteristic diagram
34 Calculation of rolling resistance lost power
35 Vehicle model
36 Transmission
$i_{DR}$ Gear ratio drive/gear output shaft to rear wheel
$i_{MS \rightarrow CeS}$ Gear ratio motor shaft to central shaft
$i_{CS \rightarrow CeS}$ Gear ratio crankshaft to central shaft
$i_{CVT}$ Gear ratio of a continuously variable transmission
$i_{ov}$ Overall gear ratio
cr Rolling resistance coefficient
cwA Air resistance coefficient
$m_{VEH}$ Vehicle weight
$v_{VEH}$ Vehicle speed
$n_{mot}$ Motor rotational speed
$P_{l,drive}$ Drive loss of drive
$P_{rolling\ friction}$ Rolling resistance lost power
$M_{mot}$ Motor torque
dP Power difference
$a_{gyro\ sensor}$ Gradient determined from gyro sensor
$P_{target,human}$ Desired constant power human
A1 Motor drive axle
A2 Intermediate shaft axle
A3 Crankshaft axle
A4 Transmission axle

What is claimed is:

1. A drive system for a vehicle, the drive system including:
a drive motor,
a first, continuously variable, transmission, wherein the first transmission and the drive motor are configured to be arranged in a central region of the vehicle, and wherein the first transmission includes an output shaft,
a central shaft,
a second transmission configured to couple the drive motor to the central shaft, wherein the central shaft is connected to an input of the first transmission, either directly or via a third transmission, or forms an input shaft of the first transmission, and
a fourth transmission configured to connect the output shaft of the first transmission to a rear wheel shaft of the vehicle, wherein a rotational speed of the output shaft of the first transmission is transferred to a driven wheel, with a ratio, $n_o/n_w$, between a rotational speed, $n_o$, of the output shaft of the first transmission and of a rotational speed, $n_w$, of the driven wheel of $n_o/n_w > 1$, via the fourth transmission, with a belt or chain.

2. The drive system according to claim 1, wherein the second transmission is a single or multi-stage transmission, comprising a fixed gear wheel transmission or a toothed belt transmission.

3. The drive system according to claim 1, wherein a crankshaft is configured to be coupled to the central shaft via a fifth transmission.

4. The drive system according to claim 3, (a) wherein a drive motor output shaft, the central shaft and the crankshaft are formed by separate axles, which are mounted separately; or
(b) wherein the drive system is constructed to be modular; or
wherein both (a) the drive motor output shaft, the central shaft and the crankshaft are formed by separate axles that are mounted separately, and (b) the drive system is constructed to be modular.

5. The drive system according to claim 3, wherein the second transmission is configured to transfer force or torque of the drive motor to the central shaft, and the fifth transmission is configured to transfer force or torque of the crankshaft to the central shaft.

6. The drive system according to claim 3, further including: (a) a freewheel arranged between the crankshaft and the central shaft, in such a way that no torque is transferred from the central shaft to the crankshaft; or (b) a freewheel/clutch element arranged between the output shaft of the drive motor and the central shaft; or both (a) and (b).

7. The drive system according to claim 3, wherein a rotational speed of the crankshaft acts via the fifth transmission with a ratio of <0.4 to the central shaft or via an intermediate shaft to the input shaft of the first transmission.

8. The drive system according to claim 3, wherein the fifth transmission comprises a toothed belt or gear wheel transmission.

9. The drive system according to claim 1, wherein the second transmission is configured to transmit rotational speed, $n_{mot}$, of the drive motor with a ratio $n_{mot}/n_{cs}>3$ to the central shaft, wherein $n_{cs}$ represents rotational speed of the central shaft.

10. The drive system according to claim 1, wherein the third transmission is configured to transmit rotational speed of the central shaft to the input shaft of the first transmission with a ratio of >1.

11. The drive system according to claim 1, wherein the drive system forms a separate unit having a drive module housing which is able to be integrated into a vehicle, wherein the drive motor, as well as the first transmission, the second transmission and the third transmission, are arranged in the drive module housing.

12. The drive system according to claim 11, wherein the drive module housing has two side plates that are connected by means of connection elements, wherein the connection elements are tube inserts that connect the side plates to one another.

13. The drive system according to claim 1, wherein elements of the drive system are configured to be arranged in or on a frame of the vehicle in a triangle arrangement, wherein the drive motor is arranged in front in a drive direction and the first transmission behind in the drive direction, and wherein the crankshaft is arranged underneath the first transmission and the drive motor.

14. The drive system according to claim 1, wherein the drive motor is configured to be plugged via a key shaft or shaft with spline, wherein: (a) a drive gear wheel of the drive motor is mounted in or on a frame of the vehicle, (b) the drive motor includes a housing comprising two plates and connection elements that connect the plates to one another in sandwich construction, or both (a) and (b), and wherein the drive motor is connected to a main tube of the vehicle.

15. The drive system according to claim 1, wherein the first transmission is a manual transmission having several speeds, wherein the first transmission is able to be switched manually, automatically or by a control computer, wherein the crankshaft is fixed and not rotatable, or both, and wherein pedals are arranged on the crankshaft.

16. A vehicle, including:
 a rear wheel; and
 the drive system according to claim 1, and configured to be coupled to the rear wheel via the rear wheel shaft.

17. The vehicle according to claim 16, wherein the vehicle is a Pedelec or e-bike.

18. The drive system according to claim 1, wherein the central shaft is configured to transmit power from the drive motor and from pedals to the first transmission.

* * * * *